(12) United States Patent
Johansen

(10) Patent No.: US 7,569,197 B2
(45) Date of Patent: Aug. 4, 2009

(54) PROCESS FOR PURIFICATION OF SULPHUR-CONTAINING EXHAUST GAS

(75) Inventor: Keld Johansen, Frederikssund (DK)

(73) Assignee: Haldor Topsoe A/S, Lyngby (DK)

( * ) Notice: Subject to any disclaimer, the term of this patent is extended or adjusted under 35 U.S.C. 154(b) by 201 days.

(21) Appl. No.: 11/712,371

(22) Filed: Mar. 1, 2007

(65) Prior Publication Data

US 2007/0209350 A1 Sep. 13, 2007

(30) Foreign Application Priority Data

Mar. 9, 2006 (DK) ................................ 2006 00338

(51) Int. Cl.
| | |
|---|---|
| B01D 53/62 | (2006.01) |
| B01D 53/72 | (2006.01) |
| B01D 53/94 | (2006.01) |
| F01N 3/10 | (2006.01) |

(52) U.S. Cl. ............. 423/213.2; 423/213.5; 423/213.7; 423/245.3; 423/215.5; 423/247; 60/274; 60/282; 60/285; 60/289; 60/299; 60/302

(58) Field of Classification Search ............. 423/213.2, 423/213.5, 213.7, 245.3, 215.5, 247; 60/274, 60/282, 285, 289, 299, 302
See application file for complete search history.

(56) References Cited

U.S. PATENT DOCUMENTS

| | | | |
|---|---|---|---|
| 4,171,289 A | * 10/1979 | Wheelock | .................. 502/333 |
| 5,591,414 A | 1/1997 | Jacob et al. | |
| 5,849,255 A | * 12/1998 | Sawyer et al. | ............. 423/213.5 |
| 5,849,256 A | * 12/1998 | Deeba et al. | ................. 423/247 |
| 5,911,961 A | 6/1999 | Horiuchi et al. | |
| 6,214,307 B1 | 4/2001 | Okumura et al. | |
| 2001/0038812 A1* | 11/2001 | Yavuz et al. | ............. 423/213.2 |
| 2008/0279738 A1* | 11/2008 | Strehlau et al. | ........... 423/213.5 |

FOREIGN PATENT DOCUMENTS

| | | |
|---|---|---|
| EP | 0 208 434 | 1/1987 |
| EP | 0 470 653 A1 | 2/1992 |
| EP | 0 411 094 | 6/1994 |
| EP | 0 622 107 A2 | 11/1994 |
| EP | 0 811 419 A2 | 12/1997 |
| GB | 2 290 488 A | 1/1996 |
| WO | WO 97/43035 | 11/1997 |

* cited by examiner

*Primary Examiner*—Timothy C Vanoy
(74) *Attorney, Agent, or Firm*—Dickstein Shapiro LLP

(57) ABSTRACT

The invention provides a process and system for purification of an exhaust gas stream from a combustion engine containing hydrocarbons, soot, carbon monoxide and sulphur dioxide. The process comprises the steps of oxidising the hydrocarbons and part of the soot in a first reactor in the presence of a first catalyst active in oxidising hydrocarbons and soot without oxidising sulphur dioxide and forming a partly purified exhaust gas stream, of cooling of the partly purified exhaust gas stream, of converting the carbon monoxide of the partly purified exhaust gas stream in a second reactor in presence of a second catalyst active in oxidising carbon monoxide without oxidising sulphur dioxide and of withdrawing a purified exhaust gas stream.

12 Claims, 2 Drawing Sheets

PROCESS FOR PURIFICATION OF SULPHUR-CONTAINING EXHAUST GAS

BACKGROUND OF THE INVENTION

1. Field of the Invention

The invention relates to a process for purifying exhaust gas from a combustion engine.

The invention is specifically directed to remove unburned hydrocarbons, soot and carbon monoxide from a sulphur dioxide containing exhaust gas collected from one or more diesel engines.

The invention is especially useful in diesel engines, where the fuel has a high content of sulphur compounds.

2. Description of Related Art

Purification of exhaust gasses is already known in the art.

Removal of $NO_x$ and CO from an exhaust gas is described in EP 0 208 434, where $NH_3$ is added, and $NO_x$ and CO are removed in contact with a catalyst.

In EP 0 411 094 a process is disclosed, where $NO_x$ is converted by means of $NH_3$ to $N_2$ in a catalyst with two layers, where also CO is converted. However, presence of $SO_2$ creates the risk of ammonia sulphate formation.

Purification of exhaust gas is also disclosed in U.S. Pat. No. 5,591,414, where the purification is performed in presence of a catalyst, which also acts as a sorption filter for removing remaining hydrocarbons simultaneously with oxidation of nitrogen oxides and carbon monoxide. The catalyst is of a honeycomb structure and has two catalytic layers.

Unburned hydrocarbons, carbon monoxide and nitrogen oxides are also converted in a process described in U.S. Pat. No. 6,214,307. This takes place in the presence of a catalyst comprising two layers of different composition active in reduction of $NO_x$ and oxidation of hydrocarbon and CO.

Prior art, however, does not mention the problem of removing HC, CO and $NO_x$ without $SO_2$ interfering by being oxidised to $SO_3$. $SO_3$ creates the risk of formation of solid sulphates or a mist of sulphuric acid. This oxidation takes place simultaneously with the other oxidation processes.

It is the object of this invention to provide a process, where hydrocarbon and carbon monoxide impurities in a sulphur containing exhaust gas are converted by oxidation without creating $SO_3$ and thereby a mist of sulphuric acid.

SUMMARY OF THE INVENTION

Pursuant to the above object, the invention provides a process for purification of an exhaust gas stream collected from a combustion engine containing hydrocarbons, soot, carbon monoxide oxides and sulphur dioxide. The process comprises the steps of oxidising the hydrocarbons and part of the soot in a first reactor in the presence of a first catalyst active in oxidising hydrocarbons and soot without oxidising sulphur dioxide and forming a partly purified exhaust gas stream; cooling of the partly purified exhaust gas stream; converting the carbon monoxide of the partly purified exhaust gas stream in a second reactor in presence of a second catalyst active in oxidising carbon monoxide without oxidising sulphur dioxide and withdrawing a purified exhaust gas stream.

The oxidation in the first reactor takes place at 250-375° C., preferably at 290-335° C.; and the oxidation in the second reactor takes place at 140-210° C., preferably at 160-205° C. The cooling takes place in a feed/effluent heat exchanger, which cools the partly purified exhaust gas stream from the first reactor and heats the exhaust gas stream to the first reactor. Optionally, an additional cooling takes place in an air cooler upstream of the second reactor.

The invention comprises further a system for purification of an exhaust gas stream from a combustion engine containing hydrocarbons, soot, carbon monoxide and sulphur dioxide comprising a feed/effluent heat exchanger heating the exhaust gas stream, a first reactor with a first catalyst active in converting hydrocarbons and soot without generation of $SO_3$ and a second reactor with a second catalyst active in converting carbon monoxide to carbon dioxide and without oxidising sulphur dioxide, forming a purified exhaust gas stream.

The process and system is especially useful, when the exhaust gas is coming from a stationary mounted diesel engine, where the diesel has a high content of sulphur, and where it is important that formation of a mist of sulphuric acid is avoided. This is particularly relevant, when diesel engines are installed in laboratories.

DETAILED DESCRIPTION OF THE INVENTION

At combustion of a hydrocarbon fuel in an engine excess air is present and the exhaust gas then comprises, in addition to $N_2$, $O_2$, $H_2O$ and $CO_2$, the impurities of incompletely combusted hydrocarbons, soot, CO, NO, $NO_2$ and $SO_2$.

The impurities can be catalytically oxidised to $H_2O$, $CO_2$ and $SO_3$, of which $SO_3$ is unpleasant in exhaust gas, as it is smelly and poisonous. In addition, it absorbs water resulting in sulphuric acid most likely as a mist.

Today, the hydrocarbon and carbon monoxide impurities in exhaust gasses are oxidised at above 210° C. in presence of precious metal catalysts creating an exit temperature of 300° C. and above. However, $SO_2$ is oxidised to $SO_3$ even at 210-240° C.

The invention provides a process and system for purification of an exhaust gas stream containing of incompletely combusted hydrocarbons, soot, CO and $SO_2$. The purification proceeds without formation of a mist of sulphuric acid.

In a first reactor incompletely combusted hydrocarbons and part of the soot is oxidised to $H_2O$ and $CO_2$, while $SO_2$ remains unconverted. This is possible, when the temperature is 250-375° C. preferably 290-335° C. in the reactor and in the presence of a catalyst, and when the catalyst is a titania/silica monolith with a catalytic active layer of palladium and oxides of tungsten and vanadium. A commercially available catalyst like this is the DOXCAT™ produced by Haldor Topsøe A/S, Denmark.

The exhaust gas leaving the first reactor is cooled and introduced into a second reactor. In the second reactor CO is oxidised to $CO_2$, whereas $SO_2$ is not oxidised. This is obtained by maintaining the reactor temperature at 140-210° C., preferably at 160-205° C. and by installing a Pt/Pd monolithic oxidation catalyst. A commercially available catalyst like this is the DOC catalyst produced by Haldor Topsøe A/S, Denmark.

The cooling between the reactors can conveniently be performed in a feed/effluent heat exchanger for the first reactor and possible further cooling in an additional cooler such as an air cooler.

It is an advantage to add some air into the exhaust gas coming from the combustion engine. This controls both concentration of impurities and temperature of the gas to be purified.

Figure 1:
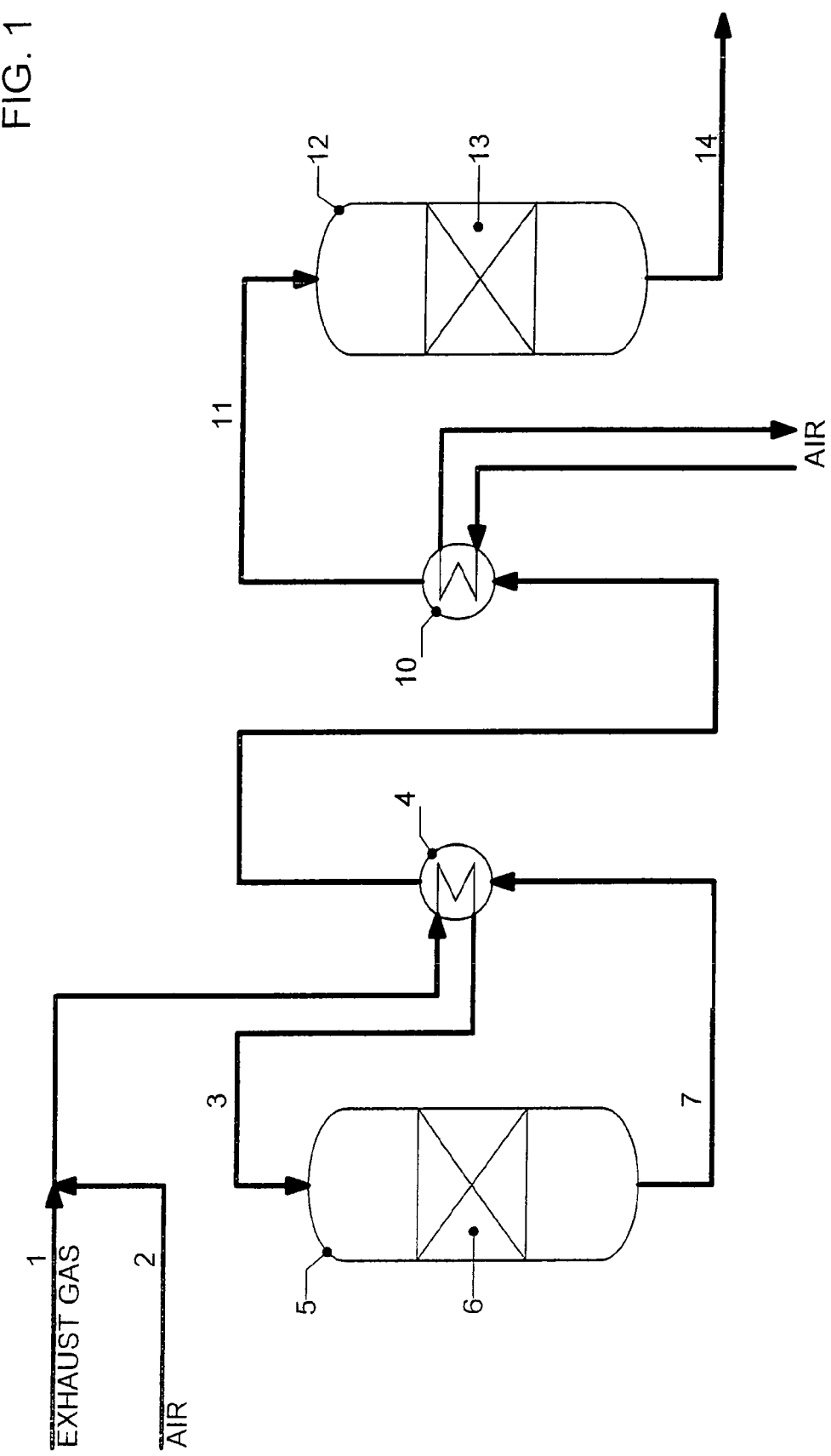
FIG. 1. is a schematic drawing of the process of the present invention.

The invention is further illustrated by the drawings. One embodiment of the process of the invention is schematically shown on FIG. 1. An exhaust gas stream 1 is mixed with an air stream 2 and heated in a feed/effluent heat exchanger 4 forming a feed gas stream 3, which enters a first reactor 5. In reactor 5 hydrocarbons and soot are converted to $H_2O$ and $CO_2$ when passing a catalyst 6.

The partially purified exhaust gas stream 7 is cooled in feed/effluent heat exchanger 4 and subsequently in an air cooler 10. A cooled partly purified exhaust gas stream 11 flows to a second reactor 12, where a catalyst 13 is installed. This catalyst promotes the oxidation of CO and possible minor amounts of hydrocarbons without oxidising $SO_2$ to $SO_3$. After this conversion, the gas leaves the second reactor 12 as a purified exhaust gas stream 14.

Figure 2:
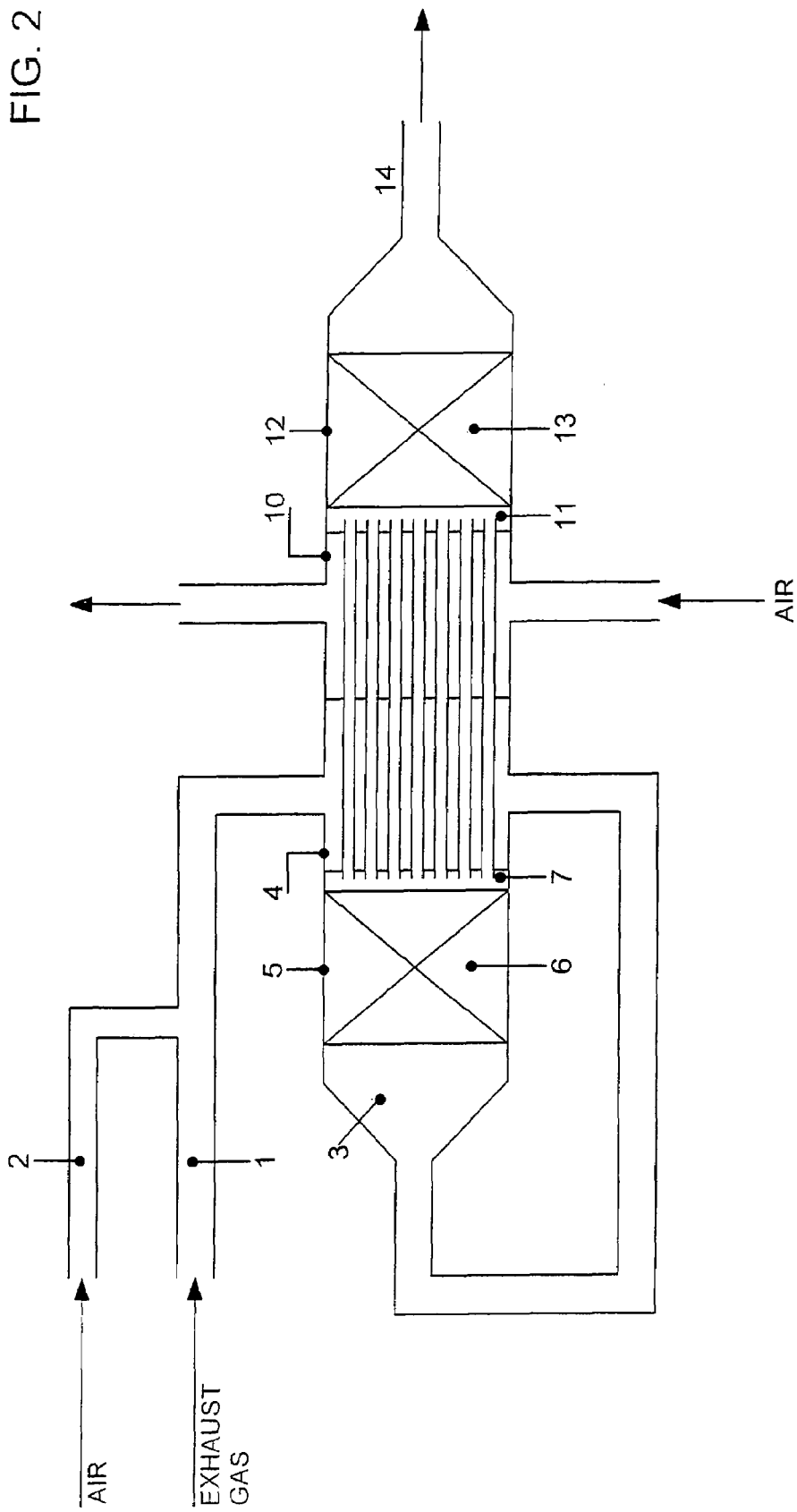
FIG. 2. is a drawing of one embodiment of the present invention.

A preferred system of the invention is shown on FIG. 2. Exhaust gas 1 collected from one or more diesel engines, typically mounted in a test laboratory, is mixed with air 2 and heated in a feed/effluent heat exchanger 4 to 300° C. This feed stream 3 enters first reactor 5, where hydrocarbons and soot are oxidised contrary to $SO_2$ which remains unconverted. The reactions take place in the presence of the catalyst 6, which is a $TiO_2$ monolith on a glass fibre material and with the following composition:

75-95 wt % $TiO_2$, 3-15 wt % $SiO_2$, 3-15 wt % $WO_3$, 0-6 wt % $V_2O_5$ and 0.3-0.8 g/l Pd, preferably 80-90 wt % $TiO_2$, 5-10 wt % $SiO_2$, 5-10 wt % $WO_3$, 0-4 wt % $V_2O_5$ and 0.4-0.6 g/l Pd.

A catalyst like this is the commercially available DOX-CAT™ at Haldor Topsøe A/S, Denmark.

The reactions are over all exothermic and the partly purified exhaust gas stream 7 leaves the first reactor at about 325° C.

Stream 7 is cooled in feed/effluent heat exchanger 4 and in air cooler 10 to 150-180° C. before entering second reactor 12. In reactor 12 CO is oxidised to $CO_2$, while $SO_2$ remains unchanged. This is possible in the presence of a catalyst 13, when it is a $TiO_2$ monolith with 0.3-0.8 g/l, preferably 0.4-0.6 g/l Pt. Such a catalyst is the DOC catalyst, which is commercially available at Haldor Topsøe A/S, Denmark. The purified exhaust gas stream 14 then leaves the purification system at 200° C.

The exhaust gas flows through the monolithic catalysts, 6 and 13, with a space velocity in the range of 10 000-150 000 $Nm^3/m^3h$, preferably in the range of 20 000-100 000 $Nm^3/m^3h$.

Alternatively, one or both of the catalysts may be of a granular structure. In case of granular catalyst, the optimal space velocity is in the range of 1 000-20 000 $Nm^3/m^3h$, preferably in the range of 5 000-10 000 $Nm^3/m^3h$.

The process of the invention is especially useful for cleaning exhaust gas from combustion engines, where the fuel is diesel with a high content of sulphur. Such diesel is often used for engines installed in a vessel or in a mobile generator or is stationary mounted in a test laboratory.

Here it is important that incompletely combusted hydrocarbons and the odourless carbon monoxide are removed.

Also mobile generators, which are not permanently running, may be fed with such a diesel and the purification process of the invention is then very useful.

EXAMPLE

An exhaust gas is cleaned by a system of the invention as illustrated in FIG. 2. Referring to FIG. 2, stream 3 is the exhaust gas to be purified and stream 7 is the partly purified exhaust gas leaving the catalyst 6 in the first reactor. Stream 11 is the cooled partly purified exhaust gas entering second reactor with second catalyst 13, and stream 14 is the purified exhaust gas stream.

10 000 $Nm^3/h$ exhaust gas is purified.

The first catalyst bed is 0.5 $m^3$ of a DOXCAT™, and the second catalyst bed is 0.5 $m^3$ of a DOC catalyst.

The conversion of the impurities in the catalyst beds and the corresponding temperatures are seen from Table 1 below, which also shows the contents of impurities in the exhaust gas streams.

TABLE 1

| | Stream No. | | |
|---|---|---|---|
| | 3 | 7/11 | 14 |
| Temperature, ° C. | 300 | 325/180 | 200 |
| HC, ppm | 200 | <40 | <5 |
| Soot, % of content | 100 | 70 | 70 |
| CO, ppm | 2000 | 2000 | <100 |
| $SO_2$, ppm | 200 | 200 | 190-200 |
| $SO_3$, ppm | <5 | <5 | <10 |

From the results in Table 1, it appears that the poisonous hydrocarbons and soot are removed without oxidation of $SO_2$ to $SO_3$.

The invention claimed is:

1. A process for purification of an exhaust gas stream from a combustion engine containing hydrocarbons, soot, carbon monoxide, nitrogen oxides and sulphur dioxide, comprising the steps of
   (a) oxidising the hydrocarbons and part of the soot in a first reactor in the presence of a first catalyst active in oxidising hydrocarbons and soot without oxidising sulphur dioxide and forming a partly purified exhaust gas stream;
   (b) cooling of the partly purified exhaust gas stream;
   (c) oxidising the carbon monoxide of the partly purified exhaust gas stream in a second reactor in presence of a second catalyst active in oxidising carbon monoxide without oxidising sulphur dioxide; and
   (d) withdrawing a purified exhaust gas stream.

2. A process of claim 1, wherein part of the hydrocarbons is oxidised in the first reactor, and remaining hydrocarbons are further oxidised in the second reactor.

3. A process of claim 1, wherein the oxidation in the first reactor takes place at 250-375° C.; and the oxidation in the second reactor takes place at 140-210° C.

4. A process of claim 1, wherein the exhaust gas stream is combined with an air stream, and the combined stream is used as feed gas stream to the first reactor.

5. A process of claim 1, wherein the cooling in step b takes place in a feed/effluent heat exchanger, which cools the partly purified exhaust gas stream from the first reactor and heats the exhaust gas stream to the first reactor.

6. A process of claim 1, wherein an additional cooling takes place in an air cooler upstream of the second reactor.

7. A process of claim 1, wherein the catalyst in the first reactor is a monolith of titania/silica with palladium and oxides of tungsten and vanadium as catalytic active material; and the catalyst in the second reactor is a monolith of titania with platinum and/or palladium as catalytic active material.

8. A process of claim 1, wherein the space velocity in the reactors is 10 000-150 000 $Nm^3/m^3/h$.

9. A process of claim 1, wherein the catalyst in at least one reactor is a granular catalyst and wherein the space velocity is 1 000-20 000 $Nm^3/m^3/h$.

10. A system for purification of an exhaust gas stream from a combustion engine containing hydrocarbons, soot, carbon monoxide and sulphur dioxide comprising
   (a) a feed/effluent heat exchanger heating the exhaust gas stream;
   (b) a first reactor with a first catalyst active in converting the hydrocarbons and the soot in the heated exhaust gas stream without oxidising the sulphur dioxide forming a partly purified exhaust gas stream, which is being cooled in the feed/effluent heat exchanger; and
   (c) a second reactor with a second catalyst active in converting carbon monoxide to carbon dioxide and without oxidising sulphur dioxide forming a purified exhaust gas stream.

11. A system of claim 10, wherein the second catalyst further is active in oxidising remaining hydrocarbons in the partly purified exhaust gas stream.

12. A system of claim 10, wherein an air cooler is installed upstream of the second reactor.

* * * * *